United States Patent
Jäppi et al.

(10) Patent No.: US 9,682,491 B2
(45) Date of Patent: Jun. 20, 2017

(54) METHOD AND ARRANGEMENT FOR HANDLING NARROW ROLLS

(71) Applicant: UPM Raflatac Oy, Tampere (FI)

(72) Inventors: Juha Jäppi, Tampere (FI); Ari Veikkola, Nokia (FI); Juho Kantanen, Vuorentausta (FI); Ari Hakala, Siuro (FI); Jukka Piitulainen, Siivikkala (FI)

(73) Assignee: UPM RAFLATAC OY, Tampere (FI)

( * ) Notice: Subject to any disclaimer, the term of this patent is extended or adjusted under 35 U.S.C. 154(b) by 168 days.

(21) Appl. No.: 14/403,080

(22) PCT Filed: May 21, 2013

(86) PCT No.: PCT/FI2013/050549
§ 371 (c)(1),
(2) Date: Nov. 21, 2014

(87) PCT Pub. No.: WO2013/175067
PCT Pub. Date: Nov. 28, 2013

(65) Prior Publication Data
US 2015/0135916 A1    May 21, 2015

(30) Foreign Application Priority Data
May 22, 2012   (FI) ...................................... 20125542

(51) Int. Cl.
*B26D 7/32*    (2006.01)
*B65G 1/04*    (2006.01)

(52) U.S. Cl.
CPC .............. *B26D 7/32* (2013.01); *B65G 1/0442* (2013.01); *Y10T 83/0448* (2015.04); *Y10T 83/2074* (2015.04)

(58) Field of Classification Search
CPC ..... B26D 7/32; B65G 1/0443; Y10T 83/2074; Y10T 83/0448; B65H 19/126; B65H 2407/10; B65H 2405/4223; B65H 2553/416; B26H 2301/41702
USPC ...... 83/13, 23; 414/282, 347, 786, 911, 277, 414/279, 281, 273; 242/559, 560, 559.3, 242/58.6, 57, 59
See application file for complete search history.

(56) References Cited

U.S. PATENT DOCUMENTS 3,871,288 A * 3/1975 White ..................... B65B 27/10
                                                  100/2
4,406,570 A    9/1983   Duncan et al.
5,076,751 A * 12/1991 Kafka .................. B65H 19/126
                                                  414/282

(Continued)

FOREIGN PATENT DOCUMENTS

EP         0542245 A2    5/1993
EP         0574307 A2    12/1993
(Continued)

*Primary Examiner* — Ghassem Alie
(74) *Attorney, Agent, or Firm* — Cantor Colburn LLP (57) ABSTRACT

A method and an arrangement for handling narrow rolls in a warehouse is described. The warehouse includes at least one rack row, at least one isle, and at least one carriage arranged to move the narrow rolls into a rack and from the rack and carry the narrow rolls along the isle. A distance is arranged between the narrow rolls and the distance is maintained between the narrow rolls when the narrow rolls are in the racks of the warehouse.

20 Claims, 4 Drawing Sheets

(56) References Cited

U.S. PATENT DOCUMENTS

| | | | | |
|---|---|---|---|---|
| 5,085,377 | A | * | 2/1992 | Rohrer .................. B65G 37/02 |
| | | | | 242/559.3 |
| 5,388,955 | A | * | 2/1995 | Schroder ................. B65G 1/02 |
| | | | | 414/267 |
| 5,451,132 | A | * | 9/1995 | Tokiwa .................. B23Q 7/001 |
| | | | | 414/416.05 |
| 6,155,516 | A | * | 12/2000 | Lehrieder ............. B65H 19/12 |
| | | | | 242/559.3 |
| 6,948,901 | B2 | * | 9/2005 | Allemann ............ B65G 1/0407 |
| | | | | 414/279 |
| 8,011,871 | B2 | * | 9/2011 | Lehrieder ............ B65H 19/126 |
| | | | | 242/559 |
| 2004/0091340 | A1 | | 5/2004 | Allemann |
| 2009/0220323 | A1 | * | 9/2009 | Pienta .................. B65H 19/126 |
| | | | | 414/222.01 |
| 2012/0297944 | A1 | * | 11/2012 | Maddaleni ............... B26D 3/16 |
| | | | | 83/23 |

FOREIGN PATENT DOCUMENTS

| | | | |
|---|---|---|---|
| EP | 1145992 | A1 | 10/2001 |
| EP | 1510476 | B1 | 5/2007 |
| FI | 117861 | B | 3/2007 |
| JP | 4919571 | A | 2/1974 |
| JP | 57-38296 | A | 3/1982 |
| JP | 7-76403 | A | 3/1995 |
| WO | WO 92/12915 | A1 | 8/1992 |

\* cited by examiner

METHOD AND ARRANGEMENT FOR HANDLING NARROW ROLLS

FIELD OF THE INVENTION

The invention relates to a method and arrangement for handling narrow rolls.

A method and an apparatus for the handling of loads is described in EP 1510476.

BRIEF DESCRIPTION OF THE INVENTION

An object of the invention is to provide a new type of method and arrangement for handling narrow rolls.

The invention is characterized by the features of the independent claims.

According to an embodiment the narrow rolls are handled in a flow-through warehouse that comprises an inlet end and an outlet end. The narrow rolls are fed into the inlet end in a first direction. The flow-through warehouse comprises at least two rack rows having a second direction transverse to said first direction and at least two isles having the second direction. The flow-through warehouse further comprises carriages such that at least one carriage moves along each isle. In the flow-through warehouse a customer stack is formed of several narrow rolls and delivered from the outlet end to be transported to the customer. The carriages move the narrow rolls into the rack and from the rack and also carry them in the transverse direction if needed. At least two isles comprise carriages that are capable of sorting the narrow rolls and at least one carriage is sorting the narrow rolls for forming the customer stack. Thereby the stock flow can be optimized. Thus the narrow rolls are moved through the flow-through warehouse from the inlet end to the outlet end very fast. Also the size of the flow-through warehouse need not be large and still the customer stacks can be collected rapidly and in an efficient manner.

According to another embodiment narrow rolls are handled in a warehouse. The warehouse comprises at least one rack row having a plurality of racks side by side and a plurality of racks on top of each other and at least one isle next to the rack row. The isle is provided with a carriage that is capable of moving the narrow rolls up and down whereby the carriage is called a crane. The crane is picking the narrow rolls from rack, moving the narrow rolls from an upper rack to a lower rack and carrying the narrow rolls along the isle such that the crane is handling two or more narrow rolls simultaneously.

According to a further embodiment narrow rolls are handled in a warehouse comprising at least one rack row, at least one isle and at least one carriage arranged to move the narrow rolls into a rack and from a rack and carry them along the isle. A distance is arranged between the narrow rolls and the distance is maintained between the narrow rolls when the narrow rolls are in the racks in the warehouse.

According to an embodiment narrow rolls are formed from a jumbo reel. At least two slitting machines are used for forming the narrow rolls. The jumbo reel has an axial direction when positioned on the slitting machine. The narrow rolls are transferred to the warehouse in the axial direction. The at least two slitting machines are positioned overlapping.

According to another embodiment narrow rolls are provided with a product marking in a first information adding step, the product marking comprising at least general information. In a second information adding step, the product marking in at least some of the narrow rolls is provided with customer information. After the second information adding step all the narrow rolls have a product marking comprising the customer information.

BRIEF DESCRIPTION OF THE DRAWINGS

In the following the invention will be described in greater detail by means of preferred embodiments with reference to the accompanying drawings, in which.

In the figures the embodiments are presented in a simplified manner for the sake of clarity. In the figures like parts are designated by like reference numerals.

DETAILED DESCRIPTION OF THE EMBODIMENTS

In this description the term narrow roll means a roll or a coil that is slitted from a jumbo reel. Slitting of the jumbo reel may be performed by using a slitting machine or a slitter-winder. Thus, the width of the narrow roll is smaller than the width of the jumbo reel. In an embodiment the narrow roll is cut to the length and/or width specified by a customer. In an embodiment the width of the narrow roll is smaller than 2000 mm and in another embodiment the width of the narrow roll is smaller than 1250 mm. In a further embodiment the width of the narrow roll is larger than 50 mm and in a further embodiment the width of the narrow roll is larger than 100 mm. In another embodiment the width of the narrow roll is between 50 and 2000 mm and in another embodiment the width of the narrow roll is between 100 and 1250 mm. In one embodiment the diameter of the narrow roll is smaller than 1300 mm and in another embodiment the diameter of the narrow roll is smaller than 1250 mm. In a further embodiment the diameter of the narrow roll is larger than 200 mm and in another embodiment the diameter of the narrow roll is larger than 300 mm. In a further embodiment the diameter of the narrow roll is between 200 and 1300 mm and in another embodiment the diameter of the narrow roll is between 300 and 1250 mm. In one embodiment the weight of the narrow roll is smaller than 2000 kg and in another embodiment the weight the narrow roll is smaller than 1250 kg. In another embodiment the weight of the narrow roll is more than 5 kg and in another embodiment the weight of the narrow roll is more than 10 kg. In one embodiment the weight of the narrow roll is between 5 kg and 2000 kg and in another embodiment the weight of narrow roll is between 10 and 1250 kg. In one embodiment the narrow roll is a self adhesive laminate roll wherein the adhesive is a pressure sensitive adhesive.

Figure 1:
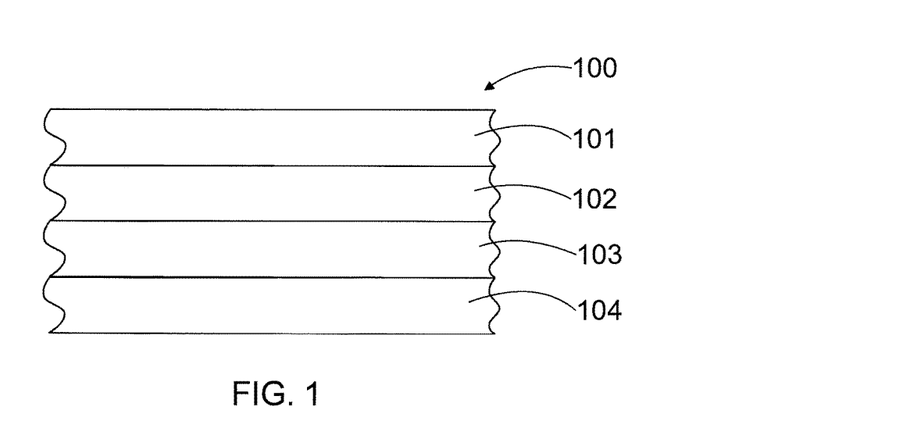
FIG. 1 is a schematic side view of a self adhesive laminate.

FIG. 1 shows a self adhesive laminate 100. In the embodiment the self adhesive laminate 100 comprises a face 101, an adhesive 102, a release component 103 and a release liner 104. The face 101 may be a face paper, for example. The adhesive 102 may be a pressure sensitive adhesive wherein the adhesive is in an activated mode, for example. The release component 103 or release material may be a silicon layer, for example. The release liner 104 may be release paper, for example. The face 101, the adhesive 102, the release component 103 and the release liner 104 may all have a one layer structure or a multilayer structure. In another embodiment the self adhesive laminate 100 comprises only the face 101 and the adhesive 102.

The self adhesive laminate is typically wound on a narrow roll during storage and transportation. The self adhesive laminate and the self adhesive laminate rolls are vulnerable to damages during their handling. Typically also the self adhesive laminate rolls in a warehouse have different widths and lengths and/or diameters. It is also typical that one delivery to the customer comprises self adhesive laminate rolls having different widths and/or diameters. The widths and/or diameters of the self adhesive laminate rolls can vary also within one customer stack that is typically positioned on a pallet. The different widths and/or diameters of the self adhesive laminate rolls provide further challenges for the handling of the self adhesive laminate rolls. Thus, the material of the narrow roll may be self adhesive laminate. Other materials of the narrow roll may be shrink film or paper, for example. In an embodiment the grammage of the material is less than 500 g/m$^2$ and in another embodiment the grammage of the material is less than 300 g/m$^2$. In a further embodiment the grammage of the material is more than 20 g/m$^2$ and in another embodiment the grammage of the material is more than 50 g/m$^2$. In a further embodiment the grammage of the material is between 20 and 500 g/m$^2$ and in another embodiment the grammage of the material is between 50 and 300 g/m$^2$.

Figure 2:
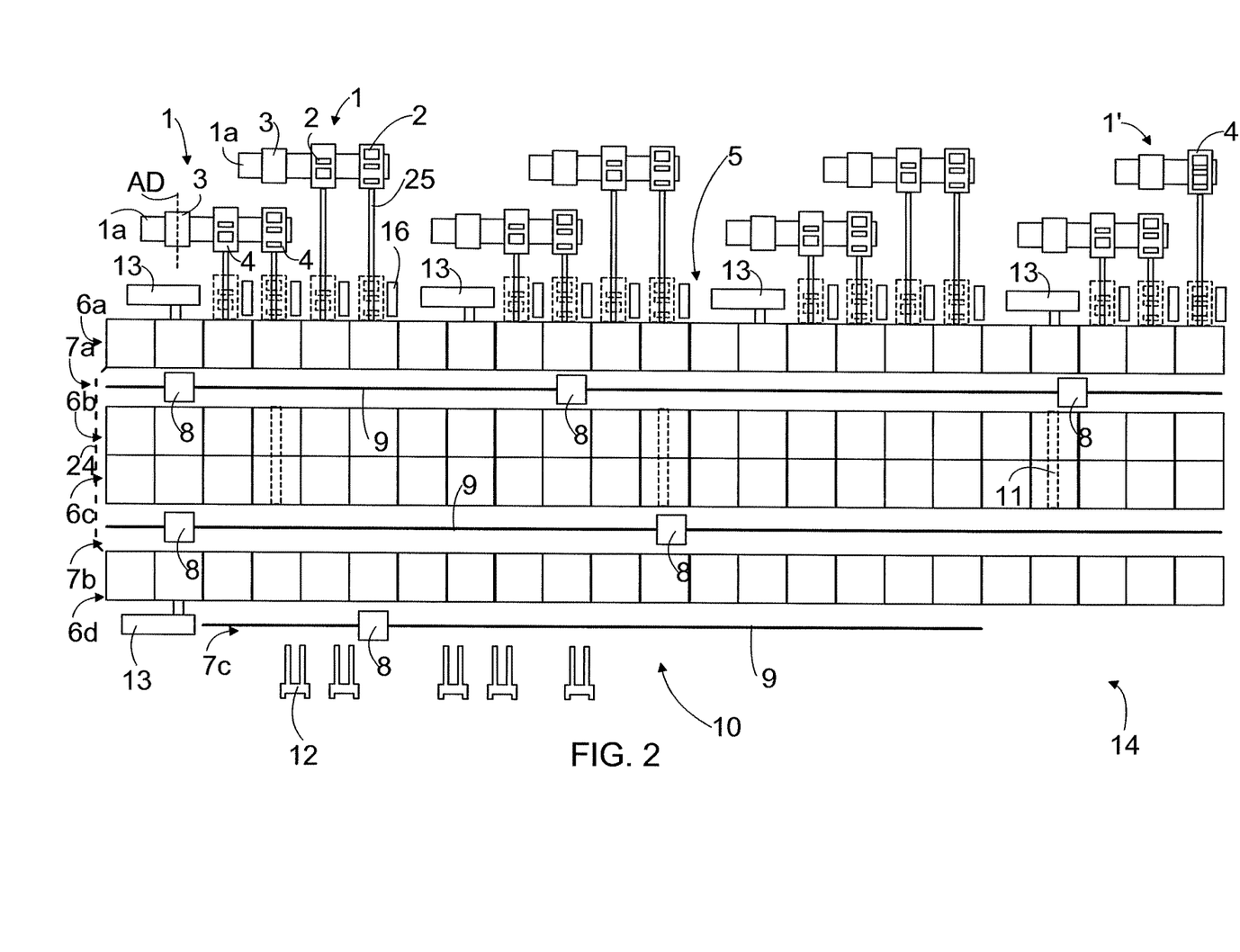
FIG. 2 is a schematic layout of a flow-through warehouse.
Figure 3:
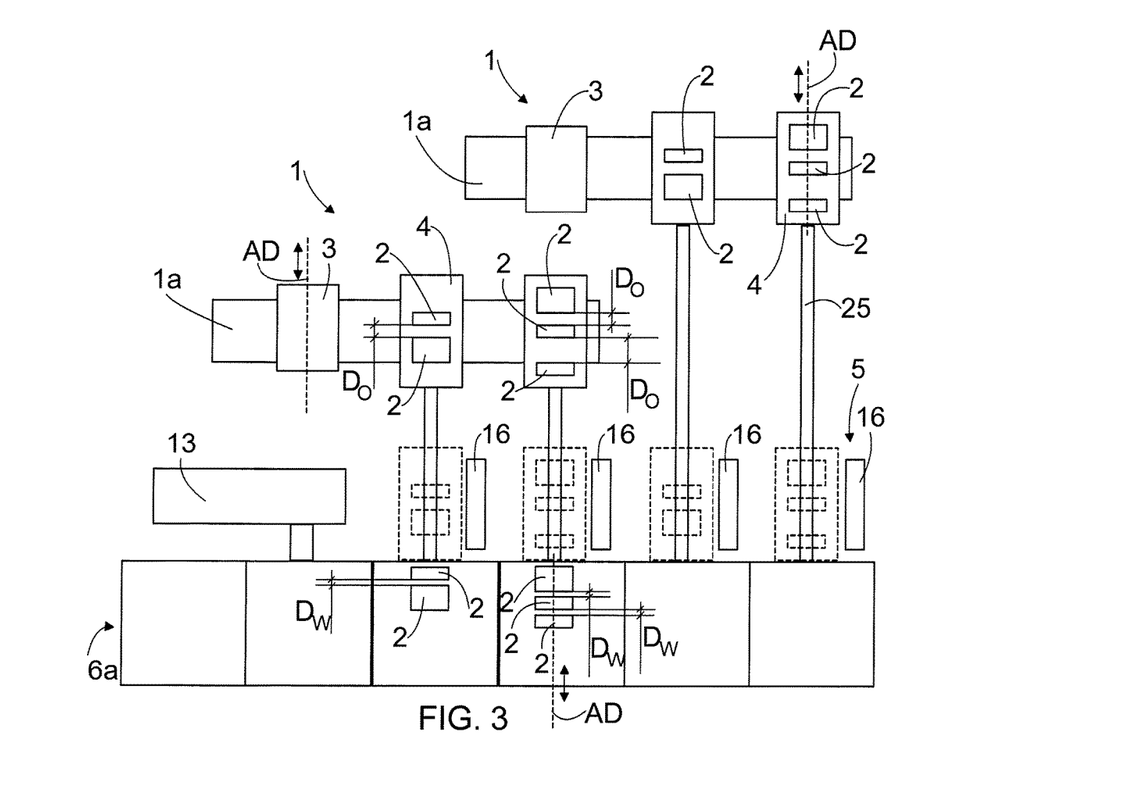
FIG. 3 is an enlarged layout of the inlet end of the flow-through warehouse shown in FIG. 2.

FIGS. 2 and 3 show a slitting machine 1 that forms self adhesive laminate rolls 2 from a jumbo reel 3. The jumbo reel 3 has an axial direction that is denoted with a broken line having a reference marking AD. Naturally the formed narrow rolls 2 have the same axial direction AD. The axial direction of the jumbo reel and the narrow roll is the direction of the center of the circular form. Thus, seen from the axial direction the jumbo reel and the narrow rolls have a circular form.

The narrow rolls 2 are formed on carrier tables 4. When the narrow rolls are on the carrier table 4 they have a mutual distance $D_O$. This distance $D_O$ depends on the width of the narrow roll that is formed from the jumbo reel 3 from between the narrow rolls in a first carrier table 4 to the second carrier table 4. Thus the distance $D_O$ between the narrow rolls on the carrier table 4 may vary.

The carrier tables 4 feed the narrow rolls 2 into the inlet end 5 of the flow-through warehouse 14. More precisely the narrow rolls are carried by the carrier table 4 from the slitting machine 1 close to the first rack row 6a and fed into the first rack row 6a.

The carrier table 4 carries the narrow rolls in a first direction and feeds them into the rack also in the first direction. In one embodiment the first direction is the same as the axial direction. In that embodiment turning of the carrier table is avoided. The carrier table 4 feeds the narrow rolls 2 such that there is a distance between the narrow rolls 2. In one embodiment the distance between the narrow rolls 2 is maintained when the narrow rolls are in the racks in the flow-through warehouse. Naturally the distance between the narrow rolls requires space in the flow-through warehouse. However, because of the distance, handling of the narrow rolls is performed fast, reliably and in an efficient manner. The ends of the narrow rolls are not necessarily straight. The ends may be concave or convex, for example. This phenomenon is called dishing. Also in such case the distance between the narrow rolls allows handling of the narrow rolls separately. The material of the narrow rolls may also contain adhesive which may be pressure sensitive adhesive that is in an activated mode. The distance between the narrow rolls prevents, however, the sticking of the narrow rolls to each other also in such case.

The carrier table 4 may be such that it equalises the distances between the narrow rolls when it feeds the narrow rolls into the rack. Thus the narrow rolls 2 may have a fixed distance $D_W$ which fixed distance thus is equal between each narrow roll. The equalised fixed distance $D_W$ between the narrow rolls 2 provides the feature that it can be optimized to be as short as possible to utilize the flow-through warehouse space as efficiently as possible and still handling of the narrow rolls is simple and reliable. Moreover the management of the narrow rolls 2 in the flow-through warehouse is easier when using a fixed distance $D_W$ between the narrow rolls. When the fixed distance Dw between the narrow rolls is used the number of narrow rolls in the warehouse is also known accurately.

A slitting machine may also form the narrow rolls on only one carrier table 4. Such an embodiment is shown with reference numeral 1' in FIG. 2. In such case there is substantially no distance between the narrow rolls after slitting. The carrier table 4 may form the distances between the narrow rolls when it feeds the narrow rolls into the rack, for example. Thus, the carrier table 4 may be used for forming a distance between the narrow rolls when it feeds the narrow rolls into the rack in all cases that the narrow rolls do not have a distance between them before they are fed into the flow-through warehouse. The narrow rolls may be transported from another location to the flow-through warehouse without a distance between them, for example.

In an embodiment the maximum value of the distance between the narrow rolls is 100 mm and in another embodiment the maximum value of the distance between the narrow rolls is 60 mm. In a further embodiment the minimum value of the distance between the narrow rolls is 20 mm and in another embodiment the minimum value of the distance between the narrow rolls is 40 mm. In another embodiment the minimum value of the fixed distance is 20 mm and the maximum value of the fixed distance is 100 mm. In another embodiment the minimum value of the fixed distance is 40 mm and the maximum value of the fixed distance is 60 mm.

In the embodiment shown in FIG. 2 the flow-through warehouse 14 comprises four rack rows 6a-6d. The rack rows 6a-6d have a second direction that is transverse to the first direction or axial direction AD. In each rack row 6a-6d there are a plurality of racks side by side. Each rack row 6a-6d may also have a plurality of racks on top of each other. A rack forms a storage surface or a storage location for the narrow roll or more typically for a plurality of narrow rolls one after the other in their axial direction. A plurality of racks side by side and/or on top of each other may also be called a shelf.

In the embodiment shown in FIG. 2 the flow-through warehouse comprises three isles 7a-7c having the second direction transverse to the axial direction AD. The first isle 7a is between the first rack row 6a and the second rack row 6b. The second isle 7b is between the third rack row 6c and the fourth rack row 6d. The third isle 7c is after the last rack row 6d.

Each isle 7a-7c is provided with at least one carriage 8 moving along the isle. A carriage 8 is provided with moving means such that when the carriage 8 moves a narrow roll 2 into a rack and from a rack the narrow roll 2 is moved in its axial direction.

Each isle 7a-7c may be provided with a rail or track 9, for example, along which a carriage 8 can move. Thus each carriage 8 may comprise roller elements and drive means for driving the roller elements, for example, for moving the carriage along the track 9.

When a carriage 8 moves along the isle it may carry a narrow roll or narrow rolls 2 without rotating the narrow roll. A carriage 8 may also be provided with lifting means for moving the narrow rolls 2 up and down. In such case the carriage 8 may be called a crane. Also during this up and down movement the rotating of the narrow rolls is avoided. The carriage or crane can transfer and lift or otherwise handle two or more narrow rolls 2 simultaneously. The dimensions and the weights of the narrow rolls and the dimensions and capacity of the carriage are determined to allow the carriage to handle two or more narrow rolls simultaneously. In an embodiment at least the carriage in the last isle 7c is such that it can transfer simultaneously two or more narrow rolls on to one pallet. When the narrow rolls and the carriage are dimensioned such that the carriage can handle two or more narrow rolls simultaneously the carriage and thus the warehouse has a high capacity. It is also possible to dimension the carriage and the narrow rolls and at least one rack such that the carriage can pick up all the narrow rolls positioned in to at least one rack.

By avoiding the rotating of the narrow rolls damages to the narrow rolls and the self adhesive laminate and damage to the edges and corners of the narrow rolls can be avoided. Also the narrow rolls do not get dirty. Moreover a code label such as a bar code label on the narrow roll 2 remains on a correct position. In this connection rotating refers to a movement around the axis of the narrow roll. In one embodiment, rotating is avoided or handling is performed without rotating if the movement around the axis is less than 5°, in another embodiment less than 3° and in a further embodiment less than 1°.

In one embodiment when the narrow rolls are in the racks, when they are moved into the rack and from the rack and when they are moved in the second direction, the direction of axis is maintained unamended or stable. The direction of axis of the narrow rolls 2 may be said first direction or axial direction AD. Thereby turning the narrow rolls 2 by a carriage or use of a turning table, for example, may be avoided. In this connection turning refers to a movement around a direction that is different than said axial direction. In one embodiment, maintaining the direction of axis unamended or stable or avoiding turning of the narrow rolls means that a movement around a direction that is different than the axial direction is less than 10° and in another embodiment less than 5°.

In the flow-through warehouse 14 a customer stack is formed of several narrow rolls 2 and the customers stack is delivered from the outlet end 10 of the warehouse. A customer stack may comprise narrow rolls 2 that have different widths and diameters and/or lengths. In such case, typically, the customer stack is formed such that at least mainly the narrow rolls having the largest diameters are positioned lowest in the customer stack. The carriages 8 in the flow-through warehouse 14 sort the narrow rolls and form finished customer stacks. A finished customer stack means that the number and type, i.e. width and length, of the narrow rolls is correct and that the order of the narrow rolls 2 is correct. By avoiding turning of the narrow rolls it is secured that the unwinding direction of the narrow rolls is the same when they come out of the warehouse.

In an embodiment there are at least three racks on top of each other, in another embodiment there are at least five racks on top of each other and in a further embodiment there are at least seven racks on top of each other. The height of at least one rack is such that it allows storing and handling of the narrow roll having the maximum diameter. The height of a rack describes how much there is space for the narrow roll to be positioned in the rack. In one embodiment the height of the rack is the distance between an upper surface of the rack and a lower surface of a rack above. The height of a rack is thus at least equal to the diameter of the narrow roll to be positioned in the rack plus a suitable clearance. The clearance allows handling of the narrow roll. Thus the carriage is able to position and remove the narrow roll as well as to lift it up for picking it up. In one embodiment the clearance has a value in a range from 10 mm to 100 mm. In a further embodiment there may be a sprinkler system integrated in the racks. In such case the space required by the sprinkler system is taken into account when determining the height of the rack.

In an embodiment the height of at least one rack is smaller such that it does not allow storage of a narrow roll having the maximum diameter. In an embodiment the height of the rack having the smaller height is at least 100 mm, in an another embodiment at least 200 mm and in a third embodiment at least 300 mm smaller than the height of the rack having the higher height.

When at least two racks on top of each other have a different height it is possible to optimize the number of racks on top of each other to be high but the height of the warehouse is not too high. It is thus possible to optimize the number of racks on top of each other in a warehouse having a certain height. Hence, it is possible to maximize the space inside the warehouse having racks on top of each other. Thus, the capacity of the warehouse can be maximized and simultaneously the flexibility of the warehouse is maintained.

In an embodiment the height of the rack having the smaller height is dimensioned such that it is capable of receiving more than 30%, in an embodiment more than 50% and in a further embodiment more than 60% of the narrow rolls. In an embodiment the height of the rack having the smaller height is capable of receiving narrow rolls that have a diameter that is equal to or smaller than 900 mm.

In one embodiment the rack having the smaller height is positioned above a rack having a larger height. In such case the need to lift narrow rolls having a large diameter is reduced. In another embodiment the majority of the racks having the larger height are positioned below the racks having the smaller height. Also in such case the need to lift narrow rolls having a large diameter is reduced. It is also possible to position the rack having the larger height above the rack having a smaller height.

Thus the diameters of the narrow rolls determine the heights of the racks. If there is a change in the diameters of the narrow rolls handled in the warehouse the height of the racks may also be changed accordingly.

Typically the customer stack is eventually provided on a pallet. On the pallet the customer stack typically lies such that the narrow roll 2 having the largest diameter is the lowest. Depending on the size of the pallet and the sizes of the customer stacks the pallet may comprise one or more customer stacks.

The carriages 8 in the first isle 7a take the narrow rolls from the racks where the carrier tables 4 feed the narrow rolls 2 and move them to another location in the first rack row 6a or in the second rack row 6b. In addition to moving the narrow rolls the carriages 8 in the first passage 7a may at least partly also sort the narrow rolls 2. Sorting may comprise arranging the narrow rolls 2 such that the narrow rolls having the same width and diameter are positioned in the same rack location. When the narrow rolls 2 are arranged as described above it is thereafter easier and faster to combine the customers stack according to a customer order. Sorting may also comprise combining narrow rolls towards a combination that forms an ordered customer stack.

During sorting the carriage 8 may take a narrow roll from a rack row and also return the narrow roll to the same rack row. During sorting the carriage 8 may also take a narrow roll from a rack row and forward the narrow roll to a rack row closer to the outlet end 10.

In the embodiment shown in FIG. 1 there is no isle between the second rack row 6b and third rack row 6c. Thus, the second rack row 6b and the third rack row 6c are side by side. The second rack row 6b and the third rack row 6c comprise through channels 11 which is provided with a conveyor. The carriages 8 in the first passage 7a feed the narrow rolls 2 that are ready to go towards the outlet end 10 or are needed to go towards the outlet end 10 to a location in the second rack row 6b that is provided with a through channel 11. The conveyor in the through channel 11 transfers the narrow rolls from the second rack row 6b to the third rack row 6b.

It would also be possible to provide an isle between the second rack row 6b and the third rack row 6c and to provide the isle with at least one carriage 8. However by positioning the rack rows side by side and providing them with at least one through channel lithe number of racks within a certain area can be enlarged.

The carriages 8 in the second isle 7b pick the narrow rolls 2 from the locations in the third rack row 6c having a through channel 11 and move them to another location in the third rack row 6c or in the fourth rack row 6d. The carriages 8 in the second isle 7b continue the sorting of the narrow rolls 2 towards the finished customer stack. The finished customer stacks or in some cases semi-finished customer stacks are transferred to the locations in the fourth rack row 6d where the carriage 8 in the last isle 7c can pick them.

The warehouse may also be provided with a fast track channel 24. The fast track channel 24 comprises a conveyor that delivers ready customers stacks directly from slitting to packing. The direct delivery of the customer stack is performed without using the carriages 8 in the isles 7a and 7b. The fast track channel 24 may be arranged to pass at least one isle comprising a carriage 8. Thereby, the fast track channel may be used for balancing the capacity of the warehouse and for fast deliveries.

The carriage 8 in the last isle 7c transfers the finished customer stacks to the outlet end 10 of the warehouse. In the outlet end 10 the customer stacks are handled by a fork lift truck 12, for example. The customer stacks may be forwarded to a packing line, for example, or to optional exits. The carriage 8 in the last isle 7c may also finish the customer stack by picking narrow rolls from two or more separate locations in the last rack row 6d. In one embodiment the carriage 8 in the last isle 7c does not sort the narrow rolls but only transfers them from the last rack row 6d to the outlet end 10. In another embodiment the carriage 8 in the last isle 7c is not a crane but only picks narrow rolls from the lowest rack. In such case the structure of the carriage may be optimized such that it is flat and fast.

A customer stack may comprise narrow rolls that come directly from a slitting machine 1 or from the warehouse where it has been stored after a previous slitting process or from a rewinded narrow roll from the rewinder 13 or the customer stack may comprise narrow rolls as a combination of above. A control system controls each of the carriages 8 and the control system comprises information of each narrow roll 2. The information of a narrow roll 2 in the control system may comprise the size of the narrow roll and its location whereby the control system can control the formation of a customer stack based on an order.

There are a plurality of rewinders 13 at the inlet end 5 of the warehouse. A carriage 8 in the first isle 7a transfers some of the narrow rolls 2 from the slitting machine 1 to a rewinder 13. Rewinding is needed if a narrow roll that has a length/diameter that is smaller than that of the jumbo reel 3 is needed. Rewinding is also used for forming larger/longer narrow rolls. In that case two narrow rolls may be combined, for example. During rewinding also resizing may be performed. In that case a narrow part from the edge of the material in the narrow roll may be slitted. Rewinding is also needed if a narrow roll is too loose.

Because rewinding is needed quite often in one embodiment there is one rewinder 13 per five slitting machines 1. In another embodiment there is one rewinder 13 per three slitting machines 1. In the embodiment in FIG. 1 there is one rewinder 1 per two slitting machines 1. At the outlet end 10 there is still another rewinder 13 if rewinding is needed at the outlet end 10.

Typically most of the narrow rolls 2 have already a defined customer stack when they come from the slitting machine 1. Thus, typically 70-90% of the narrow rolls are moved directly towards a customer stack when they come from the slitting machine. In one embodiment 40-95% and in another embodiment more than 50% of the narrow rolls are moved directly towards a customer stack when they come from the slitting machine. It is possible that some of the narrow rolls are transferred to the racks to be stored and used in a customer stack later. It is also possible to transfer all the slitted narrow rolls to the racks to be stored and used in a customer stack later.

Typically in a customer stack 70-90% of the narrow rolls come directly from the slitting machine 1. It is also possible to combine narrow rolls 2 from several different slitting machines to one customer stack. Also typically 0-30% of the narrow rolls in a customer stack come from the rewinders 13. Also, typically 0-30% of the narrow rolls 2 come to the customer stack from the storage racks of the warehouse, i.e. these narrow rolls have been stored after a previous slitting process.

The last isle 7c or the last track 9 can be shorter than the previous isles 7a, 7b. Especially, when there are three or more isles 7a-7c, the last isle may be shorter. Also the outlet 10 may be narrower than the inlet 5.

In the embodiment shown in FIG. 1 there are more carriages 8 in the first isle 7a than there are carriages in the next isles 7b or 7c. Also in the embodiment shown in FIG. 1 there are less carriages 8 in the last isle 7c than there are carriages in the previous isles 7a or 7b. Such solution provides the feature that the number of carriages is not very high but still they can handle the narrow rolls 2 such that the narrow rolls 2 are efficiently transferred from the inlet end 5 to the outlet end 10. Thus, the idle time of the slitting machines 10 and the carriages 8 can be minimized.

In an embodiment the number of carriages 8 in the first isle 7a is such that there is no or only a short idle time in the slitting machines but still the number of carriages 8 is reasonable. In one embodiment there is one carriage 8 per 1, 2-4 slitting machines. In the embodiment shown in FIG. 1 there is one carriage 8 per two slitting machines 2.

Figure 4:
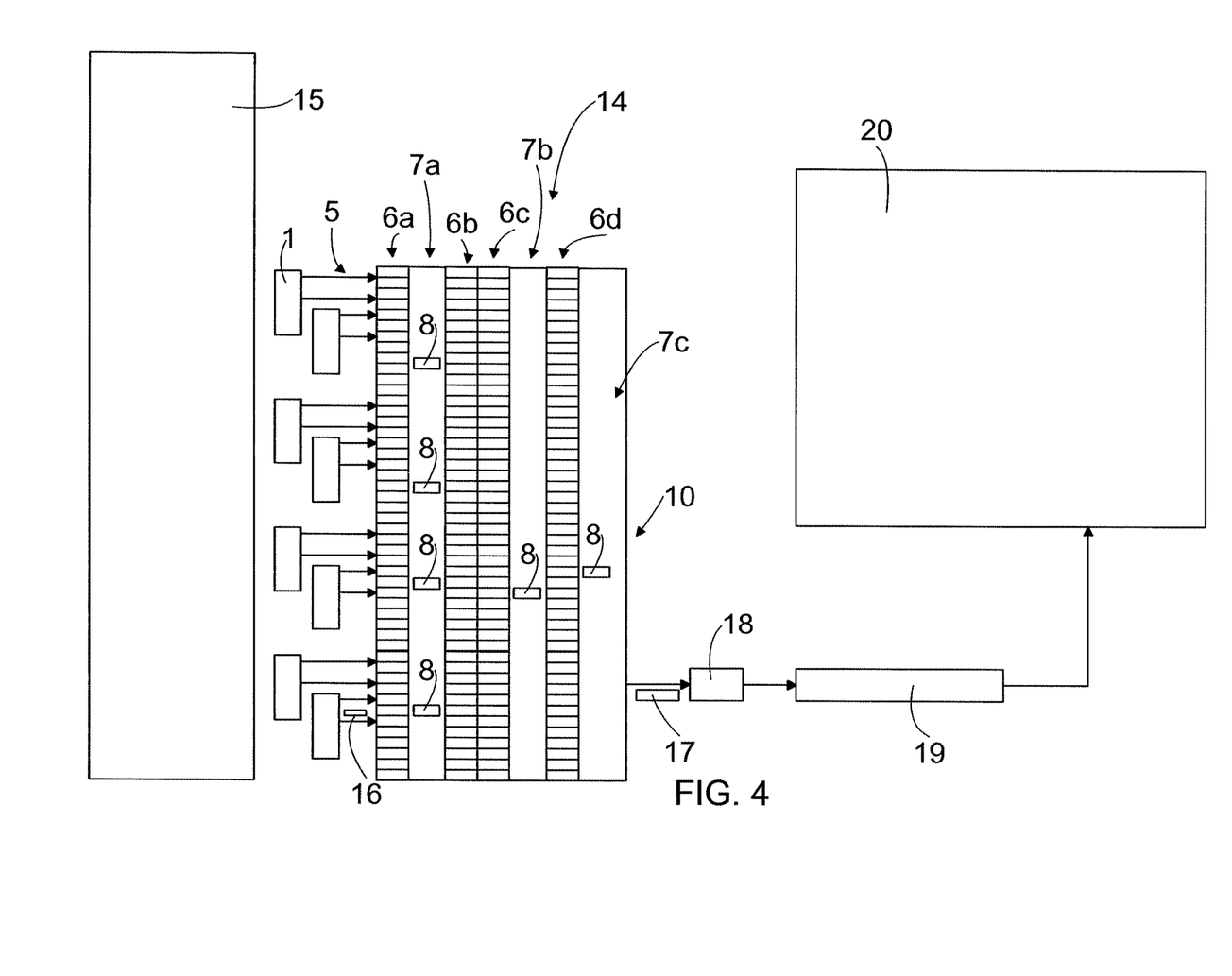
FIG. 4 is a schematic layout of another warehouse and FIGS. 5 and 6 are examples of product marking.

In an embodiment shown in FIGS. 2, 3 and 4 the slitting machines 1 are positioned overlapping. This means that seen from the inlet end 5 in the axial direction AD the body 1a of one slitting machine 1 is behind a body 1a of another slitting machine 1. This overlapping provides the feature that the slitting machines 1 do not need a wide space in the transverse direction and thus, the size of the warehouse building can be kept reasonable.

The jumbo reel 3 is positioned on the body 1a of the slitting machine such that it has the axial direction AD. The axial direction of the jumbo reel is maintained during the slitting process and the formed narrow rolls 2 also have the same axial direction AD. The narrow rolls 2 are transferred in the axial direction AD to the first row 6a of the flow-through warehouse 14. In the embodiment shown in FIGS. 2, 3 and 4 only two slitting machines 1 are positioned overlapping each other. It is also possible to provide more than two slitting machines 1 overlapping each other. In such a case however the transfer line from at least one slitting machine to the first rack row 6a becomes rather long.

The carrier tables 4 have a direct line in the axial direction AD from the slitting machine 1 to the first rack row 6a such that they have a short transfer line 25 and because the axial direction of the narrow rolls 2 is maintained the tables need not be turned.

Two slitting machines 1 can be partially overlapping or totally overlapping. The two slitting machines 1 may be similar but they may also be different, for example such that the length of the body 1a of one slitting machine 1 differs from that of another slitting machine 1. Thus, in this connection total overlapping of the slitting machines 1 means that seen from the inlet end 5 in the axial direction AD the body 1a of the slitting machine 1 that is farther away from the inlet end 5 is in its entirety behind the body 1a of the slitting machine 1 closer to the inlet end 5. Correspondingly partial overlapping of the slitting machines 1 means that seen from the inlet end 5 in the axial direction AD a part of the body 1a of the slitting machine 1 farther away from the inlet end 5 can be seen from behind the body 1a of the slitting machine 1 closer to the inlet end 5.

If the slitting machines 1 are totally overlapping the transfer line 25 from the slitting machine 1 farther from the inlet end 5 is arranged to go through the slitting machine 1 that is closer to the inlet end 5. If partial overlapping is used the transfer line 25 of the slitting machine 1 farther away from the inlet end 5 need not go through the other slitting machine. Partial overlapping is illustrated in FIGS. 2, 3 and 4.

In one embodiment the body 1a of one slitting machine 1 overlaps with another body 1a of the other slitting machine 1 by 10-70%. This overlapping percentages tells how much the body of the slitting machine 1 farther way from the inlet end 5 is behind the body 1a of the slitting machine 1 closer to the inlet end 5 seen the axial direction AD. Thus, if the slitting machines 1 overlap by 30%, for example, 30% of the body 1a of the slitting machine 1 farther away from the inlet end 5 is behind the body 1a of the slitting machine 1 closer to the inlet end 5.

The dimensions of the slitting machines 1 may be different. For example, the length of a slitting machine forming the narrow rolls on only one carrier table 4, as shown with reference numeral 1' in FIG. 2, is typically shorter than that of a slitting machine 1 that forms the narrow rolls on two carrier tables 4. The width of a slitting machine may in one embodiment vary between 2, 5 and 15 m and in another embodiment between 3 and 10 m. The length of the slitting machine may in one embodiment vary between 3 and 20 m and in another embodiment between 4 and 15 m. The width of the slitting machine is the dimension in the axial direction and the length of the slitting machine is the dimension in a direction transverse to the axial direction.

The rewinder 13 may also overlap one of the slitting machines 1. By positioning a rewinder 13 between the body 1a of the slitting machine and the first rack row 6a the space in the warehouse can be used optimally.

The rewinder 13 and the slitting machine 1 may be partly overlapping or totally overlapping. Typically the body of the rewinder 13 is smaller than the body 1a of the slitting machine 1. Thus, in this connection total overlapping of the rewinder 13 and the slitting machine 1 means that seen from the inlet end 5 in the axial direction AD the rewinder 13 is in its entirety between the body 1a of the slitting machine 1 and the first row 6a of the warehouse. Correspondingly partial overlapping of the rewinder 13 and the slitting machine 1 means that seen from the inlet end 5 in the axial direction AD only a part of the rewinder 13 is between the body 1a of the slitting machine 1 and the first rack row 6a of the warehouse.

The rewinder 13 may be positioned partly or totally inside the first rack row 6a. Naturally in such case the storing surface or channel of the rack where the rewinder 13 is positioned is shorter than the storing surface or channel of other racks.

The dimensions of the rewinders may vary for example such that in one embodiment the width of the rewinder is between 1 and 3 m and the length of the rewinder is between 2 and 5 m.

FIG. 4 shows a schematic layout of the warehouse. FIG. 4 shows a jumbo reel warehouse 15 wherefrom the jumbo reels 3 are transferred to the slitting machines 1. After the slitting machines but before the first rack row 6a there are first information adding units 16. For the sake of the clarity only one information adding unit 16 is shown in FIG. 4. However FIGS. 2 and 3 show these first information adding units 16.

After the flow-through warehouse 14, at the outlet end 10, there is a second information adding unit 17.

After the outlet end 10 there is also an interleave unit 18. In the interleave unit 18 an interleaving paper is positioned between the narrow rolls 2 in a customer stack. If in the flow-through warehouse 14 and until the narrow rolls come to the interleave unit 18 the distance between the narrow rolls 2 is maintained there is no need to separate the narrow rolls when the interleaving papers are positioned between the narrow rolls. Thus it is even possible to automate the positioning of the interleaving papers between the narrow rolls.

From the interleave unit 18 the customer stacks are transferred to a packaging line 19. The interleave unit 18 may also be situated in the packaging line 19. In the packaging line 19 the customer stacks are positioned on a pallet and the stack and the pallet are bound and wrapped for transportation. From the packaging line 19 the pallets with the customer stacks are transferred to a pallet warehouse 20. From the pallet warehouse 20 the pallets with the stacks are transported to the customer by trailer lorries or trailer trucks, for example.

Figure 5:
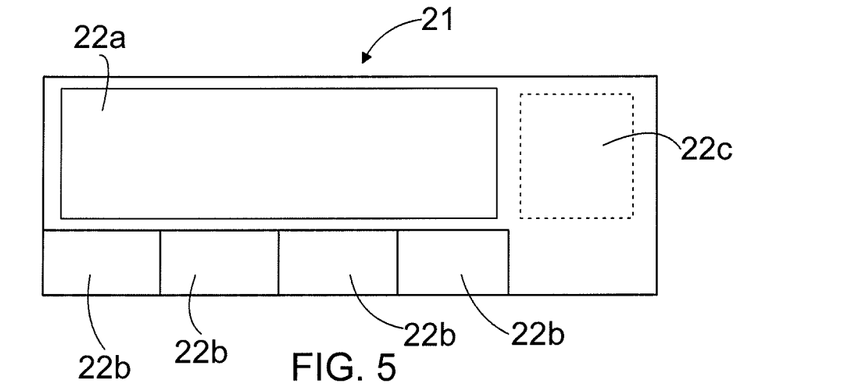

By the first information adding unit 16 each narrow roll 2 is provided with a product marking 21. FIG. 5 shows an example of a product marking 21. The product marking 21 may comprise general information 22a. General information 22 may comprise information relating to the narrow roll and the product in the narrow roll. Thus the information may comprise information of the material such as the material of the face, the adhesive and the release liner. The information 22a may also comprise information of the width and the length of the narrow roll, the core size of the narrow roll, winding direction, number of joins in the narrow roll etc.

The information 22a may also comprise tracking information and any other tracing or identifier information.

The product marking 21 may also comprise one or more baby labels 22b. The baby labels 22b may comprise the same information as in the general information part 22a or a part of the general information. The baby labels 22 may be formed such that they can easily be detached. The baby labels 22 may be ripped off, for example. The baby labels 22 may be surface attachable labels.

The general information 22a may also be called internal information because the general information 22a may be used during sorting and handling of the narrow rolls in the flow-through warehouse 14.

The product marking 21 may also comprise customer related information 22c. The customer related information 22c may comprise customer related data such as customer trademark, customer reference or any other customer specified information. After the first information adding unit 16 the product marking 21 comprises customer related information 22c only if the narrow roll already has a defined customer stack when it comes from the slitting machine 1. If however the narrow roll is transferred to the rack to be stored and used in a customer stack later, the product marking 21 naturally cannot comprise customer related information 22c. In such case the part reserved for the customer related information 22c can be left empty or the part can be used for internal information, for example. The information on the product marking 21 may be presented by using text or bar codes or RFID tags or any other suitable medium. Bar codes may be linear codes or 2D codes or matrix codes or QR codes etc. The product marking 21 may also comprise any combination of the above mentioned media.

The product marking 21 may be formed on the narrow roll by printing it onto the narrow roll by using an inkjet printer, for example. It is also possible to form the product marking 21 from a tag such that the information is provided on the tag and the tag is attached to the surface of the narrow roll 2. The tag may be a paper or a film that is glued, for example, to the narrow roll 2. The tag may also be a surface attachable label that is attached to the surface of the narrow roll 2. In such case the first information adding unit 16 may be called a labelling unit. In one embodiment the attachment of the label is performed such that there is adhesive or glue between the label and the narrow roll such that the adhesive or glue covers most of the surface area between the label and the narrow roll.

The product marking 21 may also be an invisible marking. An example of an invisible marking is a RFID tag that is positioned inside the narrow roll such that it cannot be seen outside of the narrow roll 2. In such case the invisible marking can be positioned inside the core of the narrow roll or embedded inside the structure of the core of the narrow roll. The RFID tag may also be positioned in connection with a visible tag, for example. Thus, the RFID tag may be in connection with a surface attachable label or in connection with a baby label.

Examples of the visible product marking 21 are the printed product marking and the tag that is attached to the narrow roll 2.

In the second information adding unit 17 the product markings 21 that do not have customer related information 22c are provided with the customer related information 22c. It is also possible that the customer related information 22c is not correct anymore. In such case the product marking 21 is provided with an updated customer related information 22c.

The second information adding unit 17 may add the information by printing, for example. Thus, the second information adding unit 17 may by an inkjet printer, for example.

Figure 6:
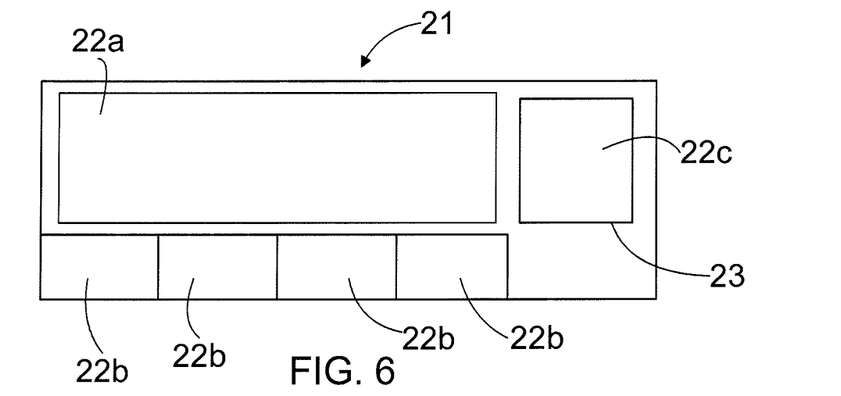

In one embodiment the customer related information 22c is provided on a tag, such as a paper or a film that is glued, for example, on the product marking 21 on the surface of the narrow roll 2. The tag may also be a customer label 23 which is a surface attachable label and the customer label 23 is attached on the product marking 21 on the surface of the narrow roll 2. This embodiment is shown in FIG. 6. In such case also the second informal adding unit 17 may be called a labelling unit.

The customer label 23 may be smaller than the area of the product marking 21, whereby in the second information adding unit 17 labels smaller than the total product marking area may be used. Thus general information 22a or baby labels 22b need not be provided on the narrow roll in the second information adding unit 17.

If the product marking 21 is invisible, naturally the second information adding unit 17 uses technology similar to the first information adding unit 16 when adding the customer related information 22c to the product marking 21.

In one embodiment the first information adding unit 16 is positioned before the first rack row 6a and the second information adding unit 17 is positioned after the first rack row 6a. In another embodiment the second information adding unit 17 is positioned after the second rack row 6b and in a third embodiment the second information adding unit 17 is positioned after the last rack row 6d.

The narrow roll may be provided with the customer related information 22c by the first information adding unit 16 if the narrow roll has a defined customer stack when it comes from the slitting machine.

In an embodiment at least 10% of the narrow rolls are provided with customer related information 22c by the first information adding unit 16. In another embodiment at least 50% of the narrow rolls are provided with customer related information 22c by the first information adding unit 16. In a further embodiment 40-95% and in another embodiment 70-90% of the narrow rolls are provided with customer related information 22c by the first information adding unit 16. In a further embodiment at least 10% of the narrow rolls are provided with the customer related information 22c by the second information adding unit 17. In a further embodiment at least 50% of the narrow rolls are provided with the customer related information 22c by the second information adding unit. In a further embodiment 100% of the narrow rolls are provided with customer related information 22c by the second information adding unit 17.

A customer stack may comprise narrow rolls directly from the slitting machines or narrow rolls that come from the storage racks of the warehouse where they have been stored for a while after a slitting process or any combination of the above. Thus, in an embodiment a customer stack comprises narrow rolls such that at least 50% of the narrow rolls are provided with customer related information 22c by the first information adding unit 16. In a further embodiment the customer stack comprises narrow rolls such that 40-95% of the narrow rolls are provided with customer related information 22c by the first information adding unit 16. In a further embodiment a customer stack comprises narrow rolls such that at least 10% of the narrow rolls are provided with the customer related information 22c by the second information adding unit 17.

In the flow-through warehouse 14, at least after the first information adding unit 16, the narrow rolls 2 are handled without rotating the narrow rolls 2. Thus, the narrow rolls are handled without moving the narrow rolls around the axis of the narrow roll. In one embodiment, rotating is avoided or handling is performed without rotating if the movement around the axis is less than 5°, in another embodiment less than 3° and in a further embodiment less than 1°. Thereby the product marking 1 remains on a correct position. Thus, for example, if the product marking is positioned on top of the narrow roll it remains on top of the narrow roll. Thereby, for example, it is easy to adjust the second information adding unit 17 to position the customer related information 22c into a correct position in the product marking 21. Furthermore, the product marking of a narrow roll is circumferentially aligned with the product marking of another narrow roll. For example, in a customer stack the product marking 21 of one narrow roll is circumferentially aligned with the product marking of another narrow roll. Circumferentially aligned means that in the circumferential direction the product marking of one narrow roll is at least partly in the same position as the product marking of another narrow roll. When in the customer stack the product markings are circumferentially aligned it is possible to position the customer stacks on the pallet such that all the product markings are circumferentially aligned and visible on the outside of the pallet.

It will be obvious to a person skilled in the art that, as the technology advances, the inventive concept can be implemented in various ways. The invention and its embodiments are not limited to the examples described above but may vary within the scope of the claims. The arrangement may also be formed such that in addition to narrow rolls also jumbo reels are transferred through the flow-through warehouse. The jumbo reels may also be transferred in the axial direction.

The invention claimed is:

1. A method for handling narrow rolls, the method comprising the steps of:
    forming narrow rolls by slitting a jumbo reel into narrow rolls, wherein each of the narrow rolls has a longitudinal axis extending through the center of circular cross section of the narrow roll in a direction parallel to the length of the narrow roll;
    feeding the narrow rolls into a flow-through warehouse, wherein the flow-through warehouse comprises
        an inlet end,
        at least one rack row,
        at least one isle,
        at least one carriage that is structured to move the narrow rolls into a rack of the at least one rack row and to carry the narrow rolls along the at least one isle, and
        an outlet end;
    providing an equalized fixed distance between the narrow rolls in the direction parallel to the longitudinal axes of the narrow rolls while feeding the narrow rolls into the inlet end of the flow-through warehouse;
    maintaining the equalized fixed distance between the narrow rolls when the narrow rolls are arranged one after another in the direction parallel to the longitudinal axes of the narrow rolls in the racks in the warehouse;
    managing the narrow rolls in the flow-through warehouse when using the equalized fixed distance between the narrow rolls by sorting the narrow rolls for forming a customer stack that is formed of several narrow rolls, the sorting being controlled by a control system; and
    delivering the customer stack from the outlet end of the warehouse.

2. The method as claimed in claim 1, wherein a minimum value of the distance is 20 mm or more.

3. The method as claimed in claim 1, wherein a minimum value of the distance is 40 mm or more.

4. The method as claimed in claim 1, wherein the distance is 100 mm or less.

5. The method as claimed in claim 1, wherein the distance is 60 mm or less.

6. The method as claimed in claim 1, wherein the distance is a fixed distance having a minimum value of 20 mm and a maximum value of 100 mm.

7. The method as claimed in claim 1, wherein the distance is a fixed distance having a minimum value of 40 mm and a maximum value of 60 mm.

8. The method as claimed in claim 1, wherein the carriage is arranged to handle two or more narrow rolls simultaneously.

9. The method as claimed in claim 1, wherein the at least one carriage moves the narrow rolls in a direction parallel to the longitudinal axis of the narrow rolls.

10. The method as claimed in claim 1, wherein the narrow rolls are fed into the flow-through warehouse by means of a carrier table, wherein the carrier table is structured to move the narrow rolls in a direction parallel to the longitudinal axis of the narrow rolls.

11. An arrangement for handling narrow rolls, the arrangement comprising:
    a slitting machine arranged to slit a jumbo reel for forming narrow rolls, wherein each of the narrow rolls has a longitudinal axis extending through the center of circular cross section of the narrow roll in a direction parallel to the length of the narrow roll;
    a flow-through warehouse that comprises
        an inlet end,
        at least one rack row,
        at least one isle,
        at least one carriage arranged to move the narrow rolls into a rack of the at least one rack row and to carry the narrow rolls along the isle, and
        an outlet end;
    a carrier table arranged to feed the narrow rolls into the inlet end of the flow-through warehouse and to provide an equalized fixed distance between the narrow rolls in a direction parallel to the longitudinal axes of the narrow rolls;
    a control system arranged to control the at least one carriage for sorting the narrow rolls for forming a customer stack that is formed of several narrow rolls; and
    a device configured to deliver the customer stack from the outlet end of the warehouse.

12. The arrangement as claimed in claim 11, wherein a minimum value of the distance is 20 mm or more.

13. The arrangement as claimed in claim 11, wherein a minimum value of the distance is 40 mm or more.

14. The arrangement as claimed in claim 11, wherein the distance is 100 mm or less.

15. The arrangement as claimed in claim 11, wherein the distance is 60 mm or less.

16. The arrangement as claimed in claim 11, wherein the distance is a fixed distance having a minimum value of 20 mm and a maximum value of 100 mm.

17. The arrangement as claimed in claim 11, wherein the distance is a fixed distance having a minimum value of 40 mm and a maximum value of 60 mm.

18. The arrangement as claimed in claim 11, wherein the carriage is arranged to handle two or more narrow rolls simultaneously.

19. The arrangement as claimed in claim 11, wherein the at least one carriage is structured to move the narrow rolls in a direction parallel to the longitudinal axis of the narrow rolls.

20. The arrangement as claimed in claim 11, wherein the carrier table is structured to move the narrow rolls in a direction parallel to the longitudinal axis of the narrow rolls.

* * * * *